Oct. 13, 1959  R. E. LYNN  2,908,194
QUICK CHANGE TOOL HOLDER AND BLOCK COMBINATION
Filed Nov. 25, 1952  2 Sheets-Sheet 1
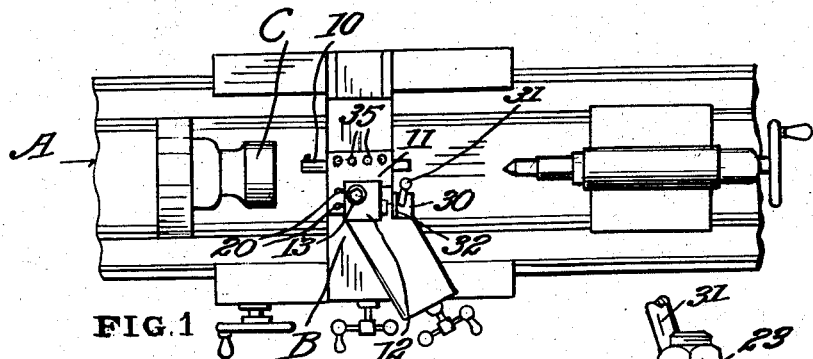
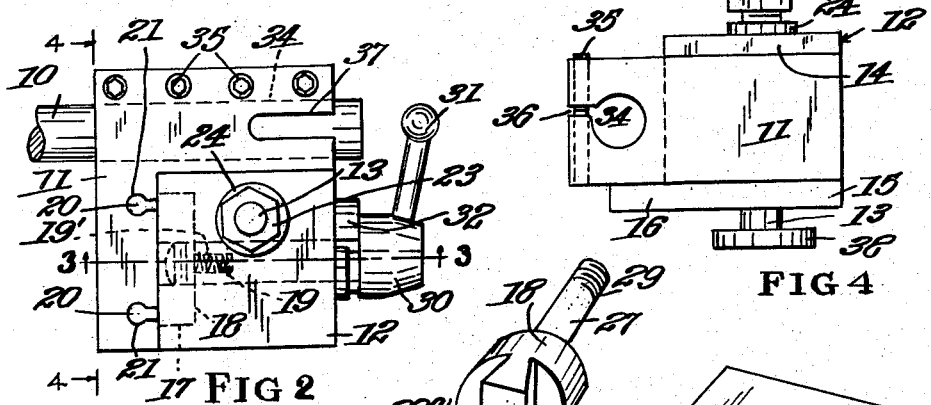
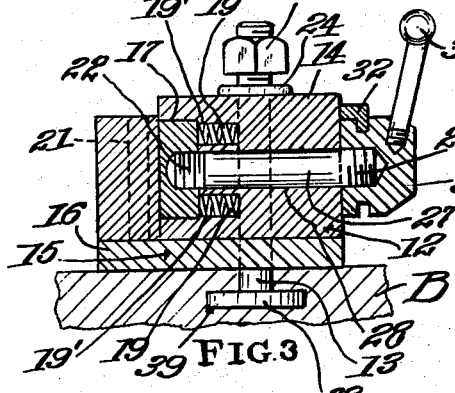
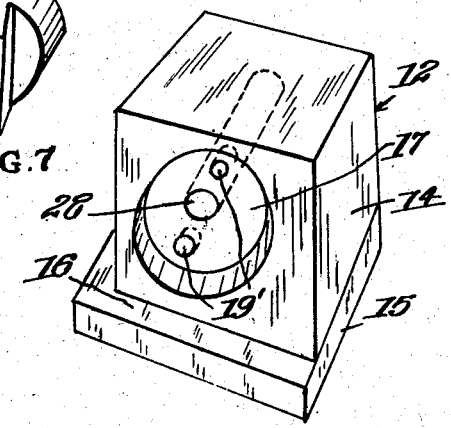
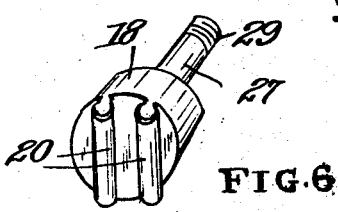
Inventor,
ROBERT E. LYNN,
By
HIS Attorney.

Oct. 13, 1959  R. E. LYNN  2,908,194
QUICK CHANGE TOOL HOLDER AND BLOCK COMBINATION
Filed Nov. 25, 1952  2 Sheets-Sheet 2
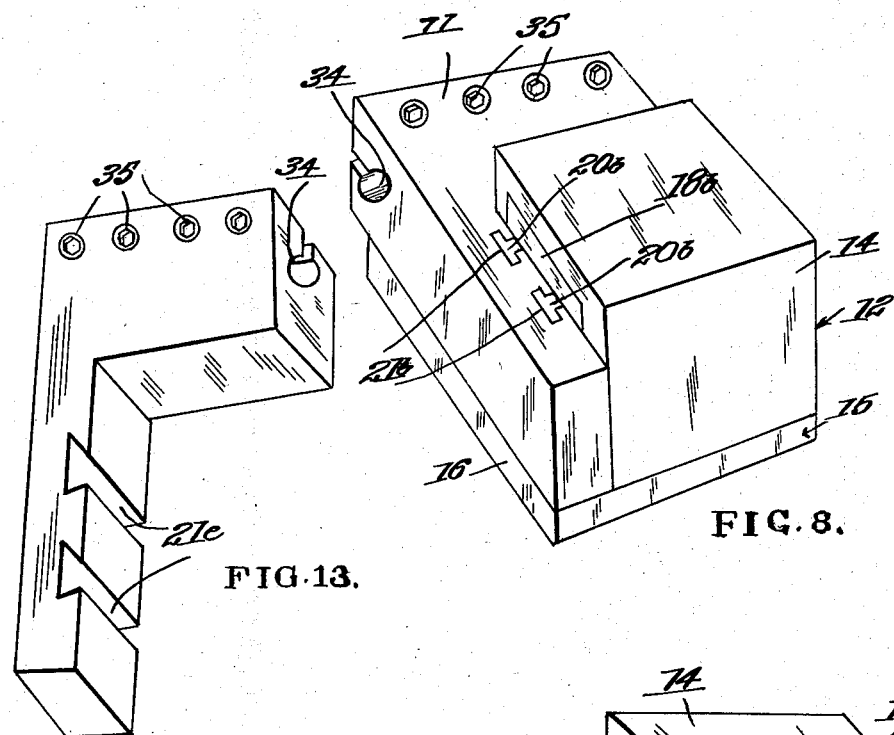
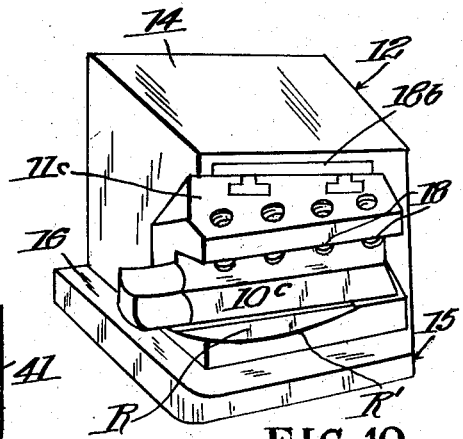
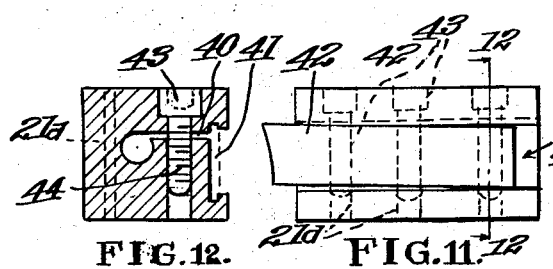
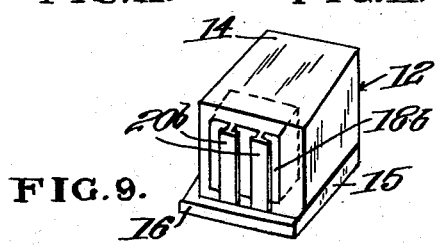
INVENTOR,
ROBERT E. LYNN,
BY
HIS ATTORNEY.

United States Patent Office 2,908,194
Patented Oct. 13, 1959

2,908,194
QUICK CHANGE TOOL HOLDER AND BLOCK COMBINATION

Robert E. Lynn, Jamestown, N.Y.

Application November 25, 1952, Serial No. 322,535

1 Claim. (Cl. 82—36)

This invention relates to improvements in a tool holder and block combination and more particularly to means whereby a general type may be more advantageously employed in a lathe screw machine or practically any metal or wood cutting machine.

My novel tool holder is capable of support by a lathe tool rest or equivalent, is quickly changeable, and is used to work in or remove metal, wood or the like and operates in either direction by power, manually, or both.

One important object is to provide novel means for holding cutting tools in coacting adapters so as to be able to remove them with maximum facility in the least possible time, in minimum space and without interference by associated parts or mechanism.

A prime object is to provide means whereby a tool holder or adapter is detachably secured to the block by means which so interengage with the block as to enable attachment and detachment thereof from the block in vertical direction.

Further, an aim is to provide means which will outwardly project therefrom to a limited extent, the means with which the adapter is interengaged so as to free the adapter for easier removal from the block.

The more specific objects and advantages will become apparent from the following description taken in connection with the accompanying drawings illustrating operative embodiments and wherein:

Fig. 1 is a fragmentary plan view of a metal-work lathe with my quick change tool-holder operatively carried by the tool rest thereof;

Fig. 2 is an enlarged plan view of my improvements;

Fig. 3 is a vertical section taken on the line 3—3 of Fig. 2 and including a fragment of the tool rest of the lathe;

Fig. 4 is a side elevation of my improvements looking from the left in Fig. 2;

Fig. 5 is a perspective view of the tool-holder block;

Fig. 6 is a perspective view of one form of adapter locking member;

Fig. 7 is a perspective view of another form of adapter locking member;

Fig. 8 is a perspective view of a modified form of block and adapter;

Fig. 9 is a perspective view of the block and locking member employed in Fig. 8;

Fig. 10 is a perspective view of a modification showing the use of an integral type adapter;

Fig. 11 is a side elevation of the integral type adapter alone with a tool bit mounted therein;

Fig. 12 is a cross-section taken substantially on the line 12—12 of Fig. 11; and Fig. 13 is a perspective view of a modified form of adapter.

Referring specifically to the drawings wherein like reference characters designate like or similar parts, a conventional metal cutting lathe is fragmentarily suggested at A and is to be taken as representative of kindred machinery since it may be a screw lathe or practically any metal or woodworking machine. Such a machine has the usual compound rest B and operating means whereby a tool carried by the rest is moved with respect to work mounted in the chuck C of the lathe.

According to my invention a cutting tool 10 such as a boring bar, drill, reamer, or the like is carried by an adapter 11 which is separably carried by a holder or block 12, clamped by a bolt 13 to the aforesaid rest B.

Said holder block 12 comprises a block proper 14 and a base 15, such parts being optionally secured together or an integral structure. Base 15 along two sides provides an outwardly extending continuous flange 16 on the block on which the adapter rests.

Disposed to laterally slide to a limited extent in a recess 17 in one vertical face of the block 14, is a locking member in the form of a plate projection 18 which is biased to slide outwardly toward the adapter 11 by expansive coil springs 19 disposed in recesses 19'. On the outer face of plate projection 18, it has one or more undercut vertical ribs 20, slidably and separably interengaging by a vertical slot or slots 21 provided in the adjacent face of the adapter 11. Initially screw-threaded at 22 to plate projection 18, and subsequently welded or otherwise rigidly secured to that plate projection is a horizontal stud or bolt 27 which is slidable in a bore opening or hole 28 of block 14, extending exteriorly of the latter and being screw-threaded at 29 to a nut 30 operable by a handle 31 extending therefrom. Recess 17 is a counterbore enlarging bore 28. Nut 30 at 32 is interengaged with and journalled in a flange or retainer 33 rigid on block 14.

Said tool 10 is detachably clamped in the adapter 11 in any suitable manner as in a hole or opening 34 parallel to one side of the block by one or more set screws 35, such adapter at 36 having a slit extending outwardly from the opening to provide somewhat resilient clamping jaws in combination with said set screws 35. 37 designates a slot useful in pressing out tools having drive pin slots.

Said bolt 13 which is separable from the block has a head 38 disposed below the block 14 to engage a slot 39 of the lathe compound rest and also has a clamping nut 23 and preferably a washer 24 above the block 14. It will be realized that the tool 10 may be removably clamped in the adapter while the latter is separated from the block and that such adapter is applicable and removable from the block with the tool 10 clamped in the adapter. Such adapter will be firmly supported on the flange 16 in combination with the general shape of the block. Removal and replacement of the adapter will be truly vertical since the interengagement of the locking means is exteriorly of the block and wholly within the confines of the adapter. The slots 21 are preferably open at both ends so that the adapter may be freely moved vertically along the ribs 20. Said nut 30 is operable in one direction to slide stud 27 and accordingly locking plate 18 against the tension of springs 19 and slide the adapter 11 to clamp or bind the inner face of one angle of the adapter against the adjacent face of the block 10 to rigidly hold the adapter and tool in operative position. Stud 27 is operable by the nut 30 in the opposite direction to loosen the locking plate and adapter so that the springs 19 (compressed by clamping the adapter to the block) will expand and move said parts outwardly to facilitate vertical removal of the adapter.

While two ribs 20 are employed in the form of Figs. 1 to 6, a single rib of any specific undercut shape or in any desired number may be used. For instance, as shown in Fig. 7 a single rib is employed being designated 20a, and adapted to coact with a single groove or slot of similar shape in the associated adapter. The undercut rib 20a in this connection may be of dovetailed shape in cross-section.

In another form of the invention as in Figs. 8 and 9, a plurality of vertical ribs 20b are provided on the locking plate 18, the latter otherwise being of the same construction previously described. These ribs 20b are of T-shape in cross-section and they engage corresponding T-shaped vertical slots or grooves 21b of the associated adapter 11.

It will be understood that the locking plate or member may be of any desired shape, that at 18, in the first form for instance, being round, while that at 18b as in Figs. 8 and 9 are rectangular.

In Fig. 10, the modified form discloses a construction wherein the block holder utilizes the same locking plate and associated parts as in Fig. 9, being otherwise similar to Fig. 8 except that a tool bit 10c is clamped in place in an integral type adapter 11c by means of set-screws 18c. This integral type of adapter may employ a separable rest R having the tool bit engageable with the adapter along arcuate surfaces at R'.

The adapter may be in the form of a block as shown in Figs. 11 and 12, having one or more vertical slots or grooves as at 21d corresponding with the vertical slot or slots or equivalent in the previously described forms. This adapter body of Figs. 11 and 12 is split from the exterior inwardly as at 40 to provide somewhat resilient clamping jaws on opposite sides thereof in order that a slot 41 in one side may accommodate a cutting tool 42 and the latter be clamped through the manipulation of the set-screws 43 passing through the adapter above slot 40 and screw-threaded to the adapter as at 44 below said slot 40.

The modified form of adapter shown in Fig. 13 differs primarily from the other described adapters in that one or more vertical slots at 21e are of dovetailed cross-section to coact with a locking plate or member such as that shown in Fig. 7, the associated locking plate, however, employing dovetailed ribs corresponding in number to the vertical slots or grooves 21e used.

Various changes may be resorted to, provided they fall within the spirit and scope of the appended claim.

What is claimed is:

In combination a tool feed block and an adapter adapted to carry a tool, said block having a flat planar face terminating in a substantially right angular flange, a bore through said block extending into said face, a counterbore in said face enlarging said bore, a rectangular plate having its bottom resting on said flange and its vertical sides beveled inwardly toward said face, a projection on said plate slidably received in said counterbore, means in said bore for drawing said plate toward said face, said adapter having a vertical planar flat face adapted to engage the face of said block and said face of said adapter having a vertical slot, spacing at one edge of said face, said slot having its vertical sides beveled outwardly for slidably engaging the beveled sides of said plate, the vertical beveled sides of said plate and adapter being sufficiently spaced and of sufficient length to restrain said adapter from movement.

References Cited in the file of this patent

UNITED STATES PATENTS

| 1,142,362 | Petz | June 8, 1915 |
| 1,265,815 | Price | May 14, 1918 |
| 2,338,951 | Malagrino | Jan. 11, 1944 |
| 2,428,508 | Weigle | Oct. 7, 1947 |
| 2,471,613 | Fry | May 31, 1949 |
| 2,625,068 | Smith | Jan. 13, 1953 |
| 2,662,445 | Jacoby | Dec. 15, 1953 |

FOREIGN PATENTS

| 830,879 | France | Oct. 11, 1938 |
| 400,147 | Italy | Nov. 25, 1942 |
| 407,267 | Italy | Sept. 26, 1944 |
| 434,059 | Italy | Apr. 21, 1948 |